United States Patent [19]

Nakagawa et al.

[11] Patent Number: 5,079,694
[45] Date of Patent: Jan. 7, 1992

[54] DATA PROCESSING APPARATUS HAVING A WORKING MEMORY AREA

[75] Inventors: Katsuhiko Nakagawa; Tomoji Nukiyama, both of Tokyo, Japan

[73] Assignee: NEC Corporation, Tokyo, Japan

[21] Appl. No.: 554,407

[22] Filed: Nov. 22, 1983

[30] Foreign Application Priority Data

Nov. 22, 1982 [JP]  Japan .................. 57-204747

[51] Int. Cl.⁵ .................. G06F 9/00; G06F 9/312
[52] U.S. Cl. .................. 395/425; 364/239.1; 364/DIG. 1
[58] Field of Search ... 364/200 MS File, 900 MS File

[56] References Cited

U.S. PATENT DOCUMENTS

| | | | |
|---|---|---|---|
| 3,898,626 | 8/1975 | Hutson | 364/200 |
| 4,003,033 | 1/1977 | O'Keefe | 364/200 |
| 4,025,771 | 5/1977 | Lynch | 364/200 |
| 4,042,972 | 8/1977 | Gruner | 364/200 |
| 4,112,489 | 9/1978 | Wood | 364/200 |

Primary Examiner—David Y. Eng
Attorney, Agent, or Firm—Sughrue, Mion, Zinn, Macpeak & Seas

[57] ABSTRACT

A data processing apparatus has a latch circuit between a processing unit and a memory. Processed data produced by the processing unit is not directly written into a working area of the memory, but is temporarily stored in the latch circuit. A write operation of the processed data stored in the latch circuit is executed in parallel with a read operation for reading the next data to be processed out of the memory and/or an executing operation of the processing unit. Therefore, processing speed is much improved. In addition, the processed data in the latch circuit can be directly transferred to the processing unit without first having to be written into the memory.

7 Claims, 3 Drawing Sheets

DATA PROCESSING APPARATUS HAVING A WORKING MEMORY AREA

FIELD OF THE INVENTION

This invention relates to a data processing apparatus, and more particularly to a data processor which executes the processing of data using working areas of a memory, such as a RAM or a group of registers.

DESCRIPTION OF THE PRIOR ART

In a well known data processor, a central processing unit (CPU) executes arithmetic operations according to a program sequence by using working areas of a memory in which data to be manipulated is temporarily stored. The CPU executes an arithmetic operation for data read out of the memory and stores an arithmetic result in the memory. This sequence is usually repeated many times. That is, in data processing, many memory accesses must be executed by the CPU. A memory read operation and a memory write operation are executed by using a read address and a write address, respectively. A timing control circuit generates timing signals for controlling a memory in such manner that at a start portion of one arithmetic operation cycle (a machine cycle) data subject to an arithmetic operation is read out of memory in response to a read address. During an end portion in the same machine cycle the resulting data (an arithmetic result) is written into the memory. Thus, at least two memory accesses (a read access and a write access) are always included within one arithmetic operation cycle of such a prior data processing sequence.

Now, the requirement for memory access time is a critical limitation on high speed processing. This limitation exists not only in a one-chip microprocessor wherein a CPU and a memory are integrated on a semiconductor chip, but also in a processor unit wherein a CPU chip and a memory chip are separately provided. As described above, however, a prior art data processor always requires at least two memory access operations in one arithmetic operation cycle, so that the prior art processor can not compute data at a high rate of speed or manipulate digital information in a short period of time as is required with microprogramming. Particularly, it is unsuitable for image processing, sound processing, etc. in which large quantities of information are transferred between a CPU and a memory.

An object of the present invention is to provide a data processing apparatus having a novel architecture which enables the high speed transfer data between a CPU and a memory.

Another object of the present invention is to provide a data processor which executes a CPU arithmetic operation in parallel with memory write operation.

A further object of the present invention is to provide a data processor in which data processing speed including the memory working area access speed is improved.

Still another object of the invention is to provide a data processor adoptable to a large number of data manipulations.

SUMMARY OF THE INVENTION

A data processing apparatus of the present invention comprises a memory having a working area wherein data to be processed is read and processed data is written; a processing unit coupled to the memory for executing an arithmetic operation by using data stored in the memory; a latch circuit for temporarily storing the processed data, whose input portion is coupled to an output portion of the processing unit and whose output portion is coupled both to the memory and to an input portion of the processing unit; means for writing the processed data stored in the latch circuit into the memory; and means for directly transferring the processed data from the latch circuit to the processing unit.

According to the present invention, the latch circuit is provided between the processing unit and the memory, so that processed data (the arithmetic result) derived from the processing unit is not directly written into the memory but is temporarily stored in the latch circuit. The processed data stored in the latch circuit is written into the memory during a period when the processing unit executes a next arithmetic operation by using data read out of the memory. Thus a write operation involving the processed data and an arithmetic operation are executed in parallel. In other words, the memory write operation overlaps the arithmetic operation of the CPU. Therefore, high speed data processing can be achieved.

The prior art data processor is controlled such that after a processed data is written into a memory during the end portion (write portion) of a processing cycle (a machine cycle), data to be processed in a subsequent processing cycle is then read out of the memory. The data processor according to the present invention is controlled such that a data read operation with respect to data to be processed is executed before a processed data write operation. In the present invention, the writing operation is not executed after one arithmetic operation on data which is previously read out is terminated, but is executed during a next arithmetic operation on data which is read out after the one arithmetic operation. In the present invention, therefore, it is not required to independently set a writing operation time in one cycle. As the result, the actual memory access time can be extremely reduced.

If it is required that the processed data temporarily stored in the latch circuit be used in a subsequent arithmetic operation, the data processor of the present invention activates means for directly transferring the processed data stored in the latch circuit to a processing unit. Thus, the processed data is immediately transferred to the processing unit at that time when the next data is to be read out of the memory. Of course, when the processed data is directly transferred to the processing unit, this data may be simultaneously written into the memory. As described above, the transferring means is very effective in a processing sequence wherein arithmetic results (processed data) are sequentially used in a processing unit to perform a loop operation or a multiply operation, since the processing speed is very fast.

Whether a writing operation to a memory should be executed or a transferring operation to a processing unit should be executed can be determined by comparing the read address with the write address, both of which are generated under a memory access state. When the write address coincides with the read address which is applied to the memory to read data to be used in a next arithmetic operation, the content of the latch circuit is directly transferred to the processing unit. Whereas, the content of the latch circuit is written into the memory when the write address does not coincide with the read address. In the latter case, data to be processed is read out of the memory in response to the read address, and processed data stored in the latch circuit is written into the memory in response to the write address. This write operation may be executed in parallel with the read operation, if a write bit line is separated from a read bit line in a memory chip of, e.g., the three-transistor memory cell structure.

DESCRIPTION OF THE PRIOR ART

Figure 1A:
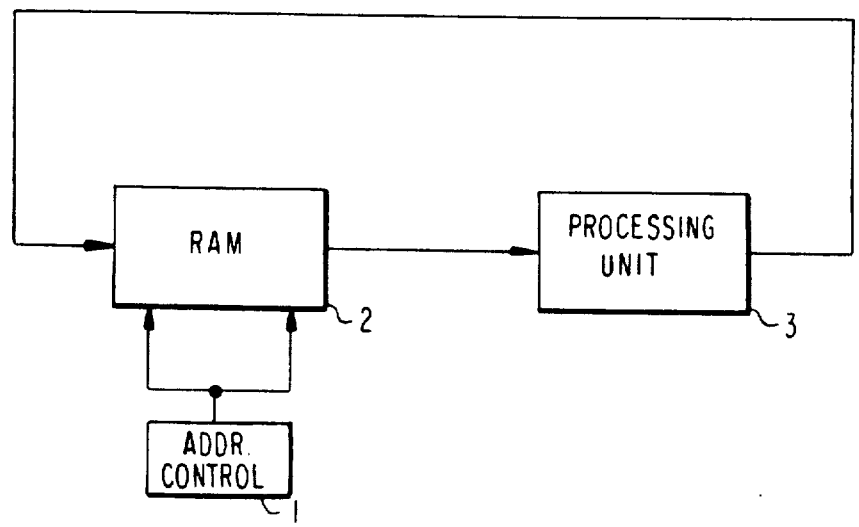
FIG. 1(a) shows a block diagram of a prior art data processor.
Figure 1B:
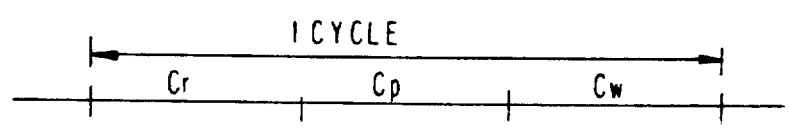
FIG. 1(b) shows its timing chart.
Figure 1B:
Figure 1B:
Figure 1B:
Figure 1B:
Figure 1B:

A prior art data processor comprises an address controller 1, a memory (RAM) 2 having a working area and a processing unit 3 as shown in FIG. 1(a). The address controller 1 applies a read address for reading data to be processed and a write address for writing processed data to the RAM 2, respectively, at different timings as shown in FIG. 1(b). The read data is transferred to the processing unit 3 and is arithmetically processed. Thereafter, the processed data is transferred to the RAM 2 and is written into the RAM 2 in response to the write address. This is the general processing flow of a CPU and a RAM with a working area in which processed data is stored and from which data to be processed is taken out. One processing cycle has a read operation cycle $C_r$, an executing operation cycle $C_p$ and a write operation cycle $C_w$, independently, in this order as shown in FIG. 1(b). Particularly, the write operation is necessarily executed separate from the executing operation or/and the read operation. Therefore, processed data is always written into the RAM 2 and is thereafter read out from there. That is, a next executing operation of the processing unit 3 can not be started until data processed in a previous executing operation has been written into the RAM 2. Further, if the processor unit 3 wants to immediately use data it has just processed, the processed data must be first written into the RAM 2 and then read out of the RAM 2 by a read operation. Therefore, the processing speed of the prior art data processor is very slow.

Figure 2:
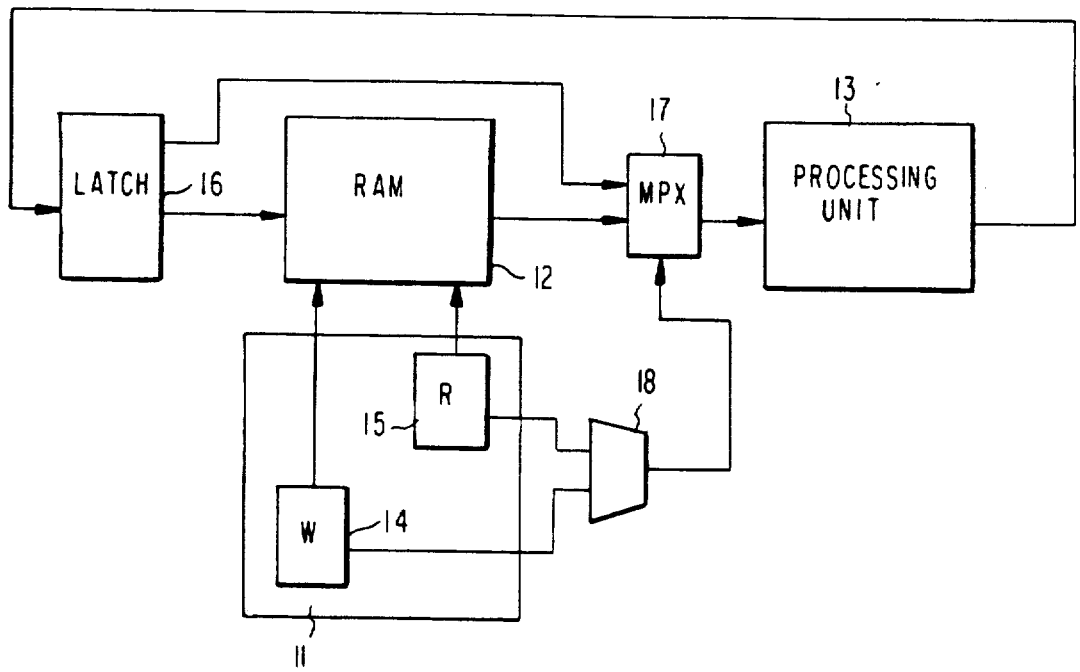
FIG. 2 shows a block diagram of one embodiment of the present invention.

In contrast, a data processor of the present invention shown in FIG. 2 can eliminate a write operation cycle from a processing cycle. The processor of FIG. 2 includes an address controller 11, a memory (RAM) 12 having a working area and a processing unit 13. The address controller 11 has a write address control circuit 14 and a read address control circuit 15. The processing unit 13 executes an arithmetic operation and is coupled to the RAM 16 via a latch circuit 16 whose input portion is coupled to an output portion of the processing unit 13 and whose output portion is coupled to the RAM 12 and to the processing unit 1 through a multiplexer 17. The multiplexer 17 is provided between the RAM 12 and the processing unit 13 for selectively transferring either data of the AM or data of the latch circuit 16. The multiplexer 17 is controlled by an output of a comparator 18. The comparator 18 comparates a read address with a write address, and generates a first signal to select data of the latch circuit when the read address corresponds to the write address, while it generates a second signal to select data of the RAM 12 when the read address does not correspond to the write address. It is noted that when the read address corresponds to the write address, data processed in a previous executing operation is immediately used in a next executing operation. Under this condition, the data stored in the latch circuit 16 is transferred to the processing unit 13 through the multiplexer 17 without a RAM access. On the other hand, when the read address does not correspond to the write address, the RAM 12 is accessed by the read address and data in the RAM 12 is transferred to the processing unit 13 through the multiplexer 17. In this case, processed data (an arithmetic result) which had been processed in the executing unit 13 in a previous operation and had been stored in the latch circuit 16 is written into the RAM 12 in response to the write address. This writing operation can be executed in parallel with the reading operation and/or a next or another executing operation of the processing unit 13. Parallel operation of the writing and the reading operations are available for a memory to which a read address and a write address can be separately applied, such as a flip-flop type memory, or a 3-transistor type memory.

Figure 3:
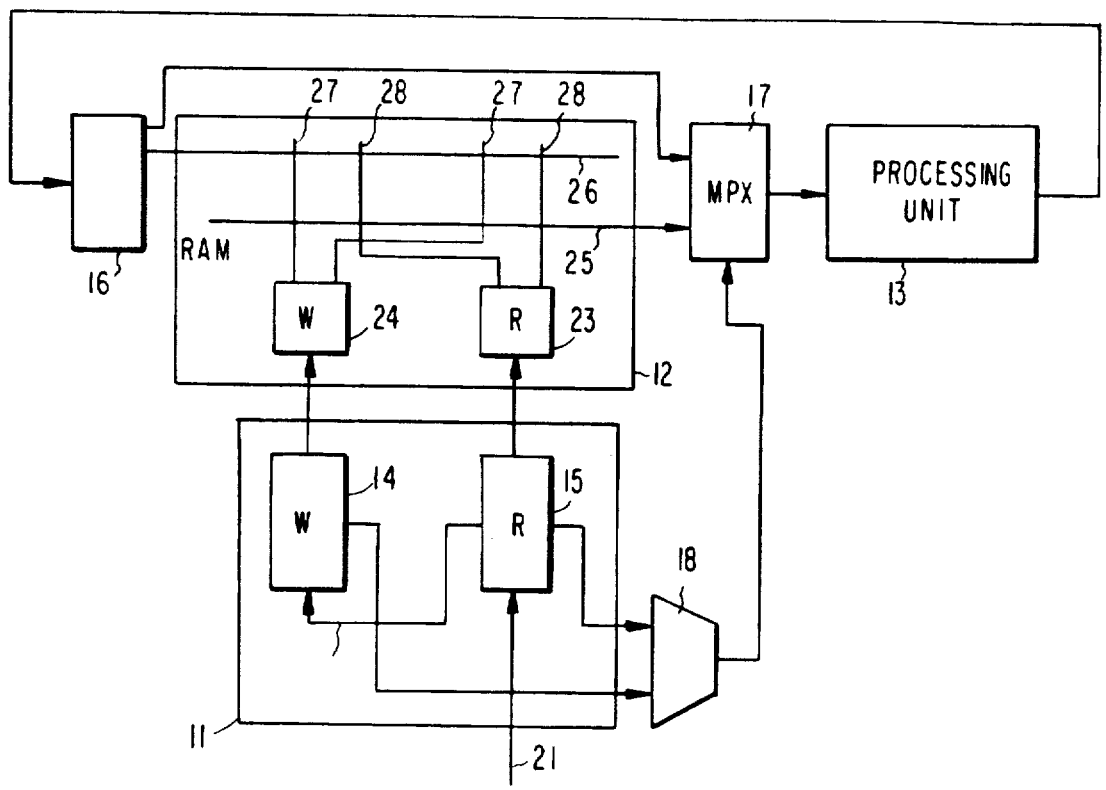
FIG. 3 shows a more detailed block diagram of the data processor shown in FIG. 2.

A detailed description of the operation of the invention will be described with reference to FIG. 3 in which the address controller 11 and the RAM 12 are shown in more detail. In this embodiment, the write address control circuit 14 and the read address control circuit 15 include a register for loading a write address and a read address, respectively. The read address is set in the register o the circuit 15, and thereafter it is shifted into the register of the circuit 14 as a write address. The read address is transferred through a bus 21 to the read control circuit 15 and is delayed for a predetermined period. The delayed read address is transferred through a bus 22 to the write control circuit 14 as a write address for writing processed data derived from the processing unit 13 into the RAM 12. Namely, it is assumed in this embodiment that a write address is the same address as a read address which is used to read data to be processed out of the RAM. In other words, processed data is stored at the same location that data to be processed had been stored.

A RAM 12 includes a write address decoder 24 generating a write address signal for selecting one of a plurality of write bit lines 27 and a read address decoder 23 for selecting one of a plurality of read bit lines 28. Data stored in a cell selected by a read bit line is read out to the multiplexer 17, and is processed in the processing unit 13. Processed data is loaded into the latch circuit 16 and thereafter is written in a cell selected by a write bit line.

Now, when a first read address is set in the read address register of circuit 15, data in a cell selected by the first read address is transferred to the processing unit 13 and then is processed. Processed data is loaded into the latch circuit 16. In this process, the first read address is shifted to the write address register 14, and a second read address for designating the next data to be processed is set into the read address register 15. When the first read address does not correspond to the second read address, data designated by the second read address is read out of the RAM and is transferred to the multiplexer 17 through a bus 25. Since in this case a comparator 18 generates a signal for selecting the RAM, the data in the RAM 12 is transferred to the processing unit 13 and is processed. In these circumstances, processed data which had been previously produced by the processing unit 13 is written into a cell designated by the first read address. On the other hand, when the first read address corresponds to the second read address, the comparator 18 generates a signal for selecting the latch circuit 16. Thus, the processed data stored in the latch circuit 16 is directly transferred to the processing unit 13 through the multiplexer 17 and is again processed by the processing unit. At this time, the processed data directly transferred to the processing unit 13 may be written into a cell designated by the first read address set in the write address register 14.

As described above, since processed data is not directly written into the RAM 12 but is temporarily stored in the latch circuit 16, a writing operation to the RAM 13 can overlap a read operation of the RAM 12 and/or a processing operation in the processing unit 13. Therefore, a very high speed processing can be obtained. Further, even if processed data is to be successively used in the processing unit 13, it can be directly transferred to the processing unit 13, so that the number of memory access operations can be reduced.

Figure 4:
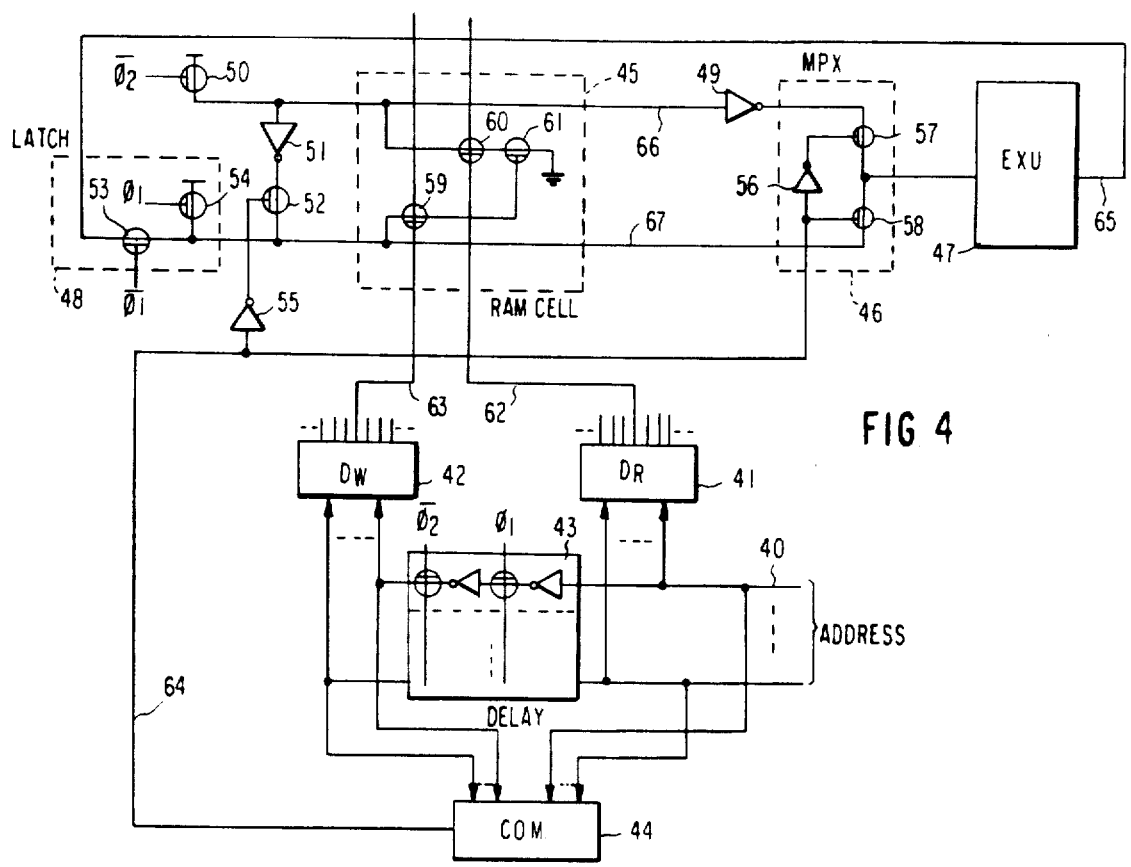
FIG. 4 shows a circuit diagram of another embodiment of the present invention in which only one representative memory cell element is illustrated.

FIG. 4 shows a circuit block diagram of another embodiment of the present invention, in which only one bit cell is illustrated. Address data 40 is applied to a read decoder 41 and a comparator 44. A delay circuit 43 delays the address data in response to clocks $\phi_1$ and $\phi_2$. The delayed address is applied to a write decoder 42 and the comparator 44. One memory cell 45 has a write transistor 59, a read transistor 60 and a hold transistor 61. The read decoder 41 generates a read control signal 62 in response to address data, whereas the write decoder 42 generates a write control signal 63 in response to a delayed address. A multiplexer 46 is coupled to the cell 45 and an execution unit (EXU) 47 executing an arithmetic operation. An output 65 of the EXU 47 is loaded to a latch circuit 68 having two transistors 53 and 54 in response to clocks $\phi_1$ and $_1$, respectively. Loaded data in the latch circuit 68 is transferred to a multiplexer 46 through a write bit line 67 of a memory. An invertor 51 and a transistor 52 form a refresh circuit. A transistor 50 is a precharge transistor. Data stored in the cell 45 is transferred to the multiplexer 46 through a read bit line 66 and a sense amp 49. An output 64 of the comparator 44 is applied to a write control transistor 52 via an invertor 55 and the multiplexer 46.

Figure 5:
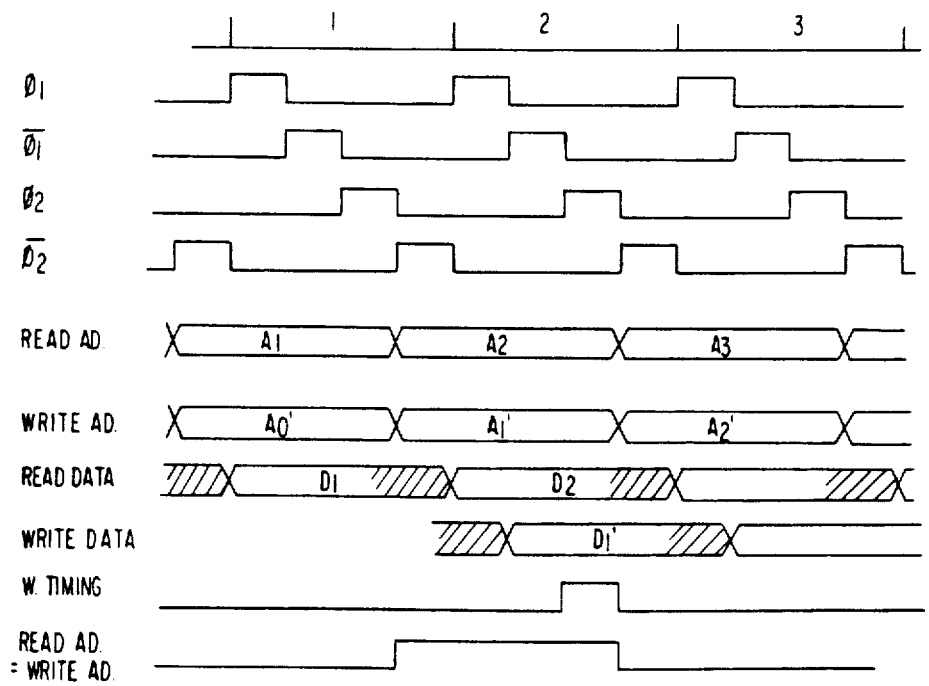
FIG. 5 shows a timing chart of the data processor shown in FIG. 4.

An operation of the processor of FIG. 4 will be described below with reference to FIG. 5 showing a timing chart. When a read address $A_1$ is decoded, the read transistor 60 is activated. At this point, the read bit line 66 had been precharged at a clock $\phi_2$ timing. Therefore, data $D_1$ stored in the transistor 61 is transferred to the multiplexer 46 via the sense amp 69. Now, if the read address $A_1$ does not correspond to a write address $A'_0$ delayed by the delay circuit 43, the comparator 44 generates a low level signal. As the result, a transistor 57 is activated, and data $D_1$ is applied to the EXU 47. The EXU 47 executes an arithmetic operation by using the data $D_1$, and produces a result (processed data) $D'_1$. The processed data $D'_1$ is temporarily stored in the latch circuit 48. In this condition, a next read address $A_2$ is generated and is decoded, then another data $D_2$ stored in another cell (not shown) is read out and is transferred to the EXU 47. In this embodiment, the processed data $D'_1$ is written into the cell 45 through a write transistor 59 in parallel with a read operation of the data $D_2$.

However, if the write address $A'_1$ corresponds to the next read address $A_2$, the comparator 44 generates a high level signal from a clock $\phi_2$ to a clock $\phi_2$. Therefore, a transistor 52 for refreshing and a transistor 57 are not activated, while a transistor 58 is activated. Thus, the processed data $D'_1$ is directly transferred to the EXU 47 through a write bit line 67.

As described above, a write operation can be executed in parallel with a read operation and/or an execution of the EXU 47, so that high speed processing can be obtained. In addition, this invention is very effective in processing systems where processed data is immediately used in a successive execution.

We claim:

1. In a data processor:
   memory means for storing data;
   a processing unit for processing received data;
   latch means for receiving and temporarily storing processed data from said processing unit;
   means for entering said processed data stored in said latch means into said memory means;
   multiplexer means having a first input coupled to an output of said latch means, a second input coupled a read output of said memory means and an output coupled to said processing unit;
   control means for causing said multiplexer means to transfer either the processed data stored in said latch means or said data stored in said memory means to said processing unit, wherein said control means includes:
   write control circuit means for receiving a write address designating a location in said memory means where said processed data in said latch means is to be stored in said memory means;
   read control circuit means for receiving a read address designating a location in said memory means storing data to be read out to said processing unit for processing; and
   comparator means for comparing a write address with a read address, said comparator means causing said multiplexer means to transfer said processed data stored in said latch means directly to said processing unit when the write address compared with the read address corresponds to each other, said comparator means causing said multiplexer means to transfer said data stored at the memory location of the memory means designated by the read address to said processing unit when the write address does not correspond to the read address.

2. In the data processor as claimed in claim 1, said data processor generating machine cycles having a first portion, a second portion following said first portion and a third portion following said second portion, and further including means for simultaneously writing the processed data stored in said latch means into said memory means and reading data from said memory means to said processing means during said first portion of a machine cycle, and for transferring the processed data from said processing unit to said latch means during said third portion of the machine cycle.

3. In the data processor as claimed in claim 1, said data processor generating machine cycles having a first portion, a second portion following said first portion and a third portion following said second portion, and further including means for simultaneously writing the processed data stored in said latch means into said memory means and processing data in said processing unit during said second portion of a machine cycle, and for transferring the processed data from said processing unit to said latch means during said third portion of the machine cycle.

4. In a data processor as claimed in claim 1 and adapted to store processed data at the same memory location in said memory means from which it originated as unprocessed data, wherein;

said write control circuit means includes a write address register for storing a write address;
said read control circuit means includes a read address register for storing a read address;
said data processor further including read address receiving means coupled to said read address register and delay means connected between the output of said read address register and the input of said write address register to transfer the read address to the write address register after a predetermined time,
said comparator means being connected to receive the read address stored in said read address register and the write address stored in said write address register, whereby said comparator means compares a present read address with the next preceeding read transferred to the write address register, and causes said multiplexor means to transfer the processed data in said latch means to said processing unit when the present read address corresponds to the next preceeding read address, and causes the multiplexor means to read the data stored at the memory location in the memory means designated by the present read address if the present read address does not correspond to the next preceeding read address.

5. In a data processor as claimed in claim 1 and adapted to store processed data at the same memory location in said memory means from which it originated as unprocessed data, said read control circuit means including a read decoder, said write control circuit means including a write decoder, said multiplexor means comprising a first electronic switch means connected to the output of said latch means, said first electronic switch having a control terminal, a second electronic switch means connected to the output of said memory means, said second electronic switch having a control terminal, and inverter means connected to the control terminal of said second electronic switch means, said data processor further including read address data input means and delay means, said read address data input means being connected to the input of said read decoder and the input of said delay means, the output of said delay means being connected to the input of said write decoder and to an input of said comparator means, another input of said comparator being connected to said read address data input means, the comparator output being connected to the control terminal of said first electronic switch means and to the inverter means, whereby present read address data is compared with previously received read address data delayed by said delay means in said comparator means, said comparator means producing a first type logic signal when the present read address corresponds to said previously received read address data to render said first electronic switch means conductive and second electronic switch means non-conductive to thereby connect said latch means directly to said processing unit, said comparator means producing a second type logic signal when the present read address data does not correspond to said previously received read address data to render said second electronic switch means conductive and said first electronic switch means nonconductive to thereby connect said memory means to said processing unit.

6. A data processing apparatus comprising:
a memory unit;
a processing unit for executing an arithmetic operation by using data which is read out of said memory unit and for producing processed data;
a latch circuit for temporarily storing said process data, the input portion of said latch circuit being coupled to said processing unit;
first means for transferring said processed data stored in said latch circuit to said memory unit;
second means for directly transferring said processed data stored in said latch circuit to said processing unit; and
means for selecting either said first means or said second means in response to a write address and a read address, said first means being selected when said does not coincide with said read address, and said second means being selected when said write address coincides with said read address.

7. A data processor comprising:
means for receiving an address information;
a memory unit;
data read-out means coupled to said receiving means and to said memory unit, for reading out data stored in said memory unit in response to said address information received by said receiving means;
delay means for delaying received said address information to produce delayed address information;
data writing means coupled to said delay means and to said memory unit, for writing data into said memory unit in response to said delayed address information;
an arithmetic unit for executing an arithmetic operation by using data supplied to said arithmetic unit and for producing result data;
latch means coupled to said arithmetic unit for temporarily storing said result data;
first means for transferring said result data from said latch means to said memory unit, said result data being written into said memory unit by said writing means;
a second means for directly transferring said result data from said latch means to said arithmetic unit;
means for selectively supplying either said result data from said second means or data read out of said memory unit by said data read-out means to said arithmetic unit; and
means coupled to said receiving means, said delay means and said selectively supplying means for comparing an address information from said receiving means with an output of said delay means which has been received previously as said address information and delayed by said delay means to produce said delayed address information, said selectively supplying means supplying said result data to said arithmetic unit when the address information from said receiving means is detected by said comparing means to coincide with said output of said delay means.

* * * * *

UNITED STATES PATENT AND TRADEMARK OFFICE
CERTIFICATE OF CORRECTION

PATENT NO. : 5,079,694
DATED : January 7, 1992
INVENTOR(S) : Katsuhiko Nakagawa, et al It is certified that error appears in the above-indentified patent and that said Letters Patent is hereby corrected as shown below:

Col. 3, line 62, delete "1" and insert --13--;

Col. 3, line 65, delete "AM" and insert --RAM--;

Col. 3, line 67, delete "comparates", insert --compares--;

Col. 4, line 34, delete "o", insert --of--;

Col. 5, line 29, delete "$\phi_2$", insert --$\bar{\phi}_2$--;

Col. 5, line 40, delete "$\phi_1$ and $_1$", insert --$\bar{\phi}_1$ and $\phi_1$--;

Col. 5, line 53, delete "$\phi_2$", insert --$\bar{\phi}_2$--;

Col. 6, line 3, delete the first occurrence of "$\phi_2$", insert --$\bar{\phi}_2$--.

Signed and Sealed this

Twenty-sixth Day of October, 1993

Attest:

BRUCE LEHMAN

*Attesting Officer*   *Commissioner of Patents and Trademarks*